United States Patent
Ternoey et al.

(10) Patent No.: US 7,392,228 B2
(45) Date of Patent: Jun. 24, 2008

(54) REVENUE MANAGEMENT SYSTEM

(75) Inventors: Chris Ternoey, 5935 Bonnard Dr., Dallas, TX (US) 75230; Diana Jelescu, Dallas, TX (US)

(73) Assignee: Chris Ternoey, Dallas, TX (US)

( * ) Notice: Subject to any disclaimer, the term of this patent is extended or adjusted under 35 U.S.C. 154(b) by 956 days.

(21) Appl. No.: 10/391,516

(22) Filed: Mar. 18, 2003

(65) Prior Publication Data

US 2003/0225593 A1    Dec. 4, 2003

Related U.S. Application Data

(60) Provisional application No. 60/366,717, filed on Mar. 22, 2002.

(51) Int. Cl.
*G06Q 10/00* (2006.01)
*G06F 17/00* (2006.01)

(52) U.S. Cl. .......................... 705/400; 705/1
(58) Field of Classification Search .............. 705/4, 705/1
See application file for complete search history.

(56) References Cited

U.S. PATENT DOCUMENTS

| | | | | |
|---|---|---|---|---|
| 5,329,612 A | * | 7/1994 | Kakazu et al. ............ | 706/59 |
| 6,029,139 A | * | 2/2000 | Cunningham et al. ......... | 705/10 |
| 6,085,169 A | * | 7/2000 | Walker et al. ................ | 705/26 |
| 6,856,980 B2 | * | 2/2005 | Feldman et al. ............... | 706/47 |

OTHER PUBLICATIONS

Seiner, Robert (Oct. 2001) Business Rules Spotlight. "Taking Rules All the Way" The Data Administration Newsletter.*
Katz, Edward P. (May 2002) IEEE International Conference on Intelligent Engineering Systems, "A Multiple Rule Engine-Based Agent Control Architecture".*

* cited by examiner

*Primary Examiner*—John W Hayes
*Assistant Examiner*—Tonya Joseph

(57) ABSTRACT

A method and system for optimizing dynamic prices of reserved date-constrained services such as airline flight reservations or hotel stay reservations. Comparative trials of complex pricing policies are employed according to an application schedule that has a periodic character with respect to the arrival date of quoting circumstances. On the basis of the comparative trials, some policies are identified as contributing less revenue on average to the system than other policies. The underperforming policies are then eliminated from the application schedule, which increases the expected future revenue of the resulting system.

4 Claims, 3 Drawing Sheets

Pricing Policy Table    21

| Identifier | Policy Definition |
|---|---|
| "Greedy" | ( 10, 1) ; ($50, $100) |
| "Generous" | ( 5, 1) ; ($50, $100) |

Pricing Policy Table  21

| Identifier | Policy Definition |
|---|---|
| "Greedy" | ( 10, 1) ; ($50, $100) |
| "Generous" | ( 5, 1) ; ($50, $100) |

Application Schedule Table  31

| Arrival Date | Assigned Policy |
|---|---|
| 1/1/2003 | "Greedy" |
| 1/2/2003 | "Neutral" |
| 1/3/2003 | "Generous" |
| 1/4/2003 | "Greedy" |
| 1/5/2003 | "Neutral" |
| 1/6/2003 | "Generous" |
|  |  |
| 12/29/2010 | "Greedy" |
| 12/30/2010 | "Neutral" |
| 12/31/2010 | "Generous" |

FIG 3

REVENUE MANAGEMENT SYSTEM

CROSS-REFERENCE TO RELATED APPLICATION

This application claims the benefit under 35 U.S.C. § 119 of commonly owned U.S. Provisional Application Ser. No. 60/366,717 entitled "Revenue Management System and Process for Testing Alternative Pricing Policies," filed Mar. 22, 2002, which is incorporated herein by reference.

BACKGROUND OF THE INVENTION

This invention relates to the practice of revenue management, which is the process of dynamically adjusting prices of goods or services in response to changes in market conditions or changes in supply conditions. Revenue management processes were pioneered by the passenger airline industry and have been imitated by other industries such as cargo airlines, hotels, rentals, shippers, advertisement brokers and others.

A very common application of revenue management relates to service providers who are taking reservation for "date-constrained services". By "date-constrained services," we mean that the provider will impose transaction-specific limits on the date when the buyer may use the service they purchase. Examples of such a restrictions include specified arrival and departure dates for an airline reservation as well as specified check-in and check-out dates for a hotel reservation. Airline and hotel reservations do represent a "date-constrained service" because the customer is required to use their ticket on a specific date, which was selected by the customer at the time of the purchase or transaction or reservation. Hotel reservations, rental reservations and media advertisement slots are also "date-constrained services" for precisely the same reason. In cases where the date constraint is not firm, such as an airline ticket that may be rescheduled with or without penalty, we still consider the purchase to be "date-constrained" if a payment or process, such as rebooking, is needed to alter the date constraint.

A multitude of processes and methods have been designed to address the problem of optimizing price of buying or reserving a date-constrained service. Some of these are described in the following patents and journal publications, which are believed to be relevant to the present invention:

| U.S. patents | | |
|---|---|---|
| 5,918,209 | June 1999 | Campbell, et al. |
| 5,652,867 | July 1997 | Barlow, et al. |

JOURNAL ARTICLES

Peter P. Belobaba, "Airline Yield Management, An Overview of Seat Inventory Control," *Transportation Science*, Vol. 21, (No. 2), p. 63-73, (May, 1987).

P. Belobaba, "Application of a Probabilistic Decision Model to Airline Seat Inventory Control," *Operations Research*, Vol. 37, pp. 183-197 (Mar. 4, 1989).

Garret J. van Ryzin, "Revenue Management Under Consumer-Behaviour Models of Demand," *IATA Revenue Management and Pricing Conference*, Oct. 15, 2002.

Typically these processes address the problem according to a three-step approach:

1. fit a mathematical model of demand to historic sales records;
2. project the demand model into the future; and
3. use "What-If?" analysis to see which prices would maximize revenue in the future.

Sometimes the step of fitting a demand model is called "unconstraining demand." Sometimes the step of projecting the demand model into the future is called "forecasting." Sometimes the step of applying "What-If?" analysis is called "optimization."

Elaborate efforts and investments have been made to develop specific processes to execute these steps in the most accurate possible way. A classic method for optimizing a demand model is described by Belobaba (1987, 1989). More complex methods of optimizing the demand model are described in U.S. Pat. Nos. 5,652,867 and 5,918,209. These and many other examples illustrate that revenue management processes have firmly adopted the three-step approach described above.

However, recent studies have drawn attention to the tremendous difficulty of fitting a demand model accurately. For example, van Ryzin (2002) shows that there is a substantial discrepancy between the fitted mathematical model of demand and the real behavior of a market of customers. His work shows that the discrepancy undermines the validity of the three-step approach and reduces its effectiveness.

Complex model fitting methods have been proposed in order to reduce the discrepancy. However, there are many reasons why such methods may be impractical. One reason that the data required to fit such models may exceed the data available. Another reason is that the methodology may be too complicated to be understood by a manager who is responsible for supervising this process.

Consequently, conventional revenue management processes heretofore known are generally limited in application to real markets as follows:

(a) they require highly complex calculations to be implemented and tested;

(b) they are not easily supervised because the complex equations involved are confusing to most operations managers; and (c) they are inaccurate because they are based on demand models that do not faithfully represent the complex details of consumer behavior.

BRIEF SUMMARY OF THE INVENTION

In view of the foregoing, a need exists for a method of revenue management that robustly incorporates the complex behavior of consumers as well as other complex considerations without involving processes that are too complex to be properly tested by developers or properly supervised by system managers. The present invention satisfies this need through a unique design that incorporates comparative trials of complex pricing policies.

BRIEF DESCRIPTION OF THE DRAWINGS

The features and advantages of the present invention will become apparent form the following detailed description of a preferred embodiment thereof, taken in conjunction with the accompanying drawings, in which:

FIG. 3 is an example of an application schedule table that is employed to illustrate the functionality of the preferred embodiment.

DETAILED DESCRIPTION OF THE INVENTION

A pricing policy is defined as a rule for determining the price of a service based on specific measures or statistics that are known to the service provider at the time of the purchase or reservation. For example, a hotel might employ a policy that sets the quote for reserving a room at $50 for any date where 10 or more rooms are still unreserved and also sets the charge at $100 when fewer than 10 rooms are yet unreserved. A pricing policy might also be based on such factors as the price or availability of competitor services. Many other considerations are possible as well.

Figures 1, 2:
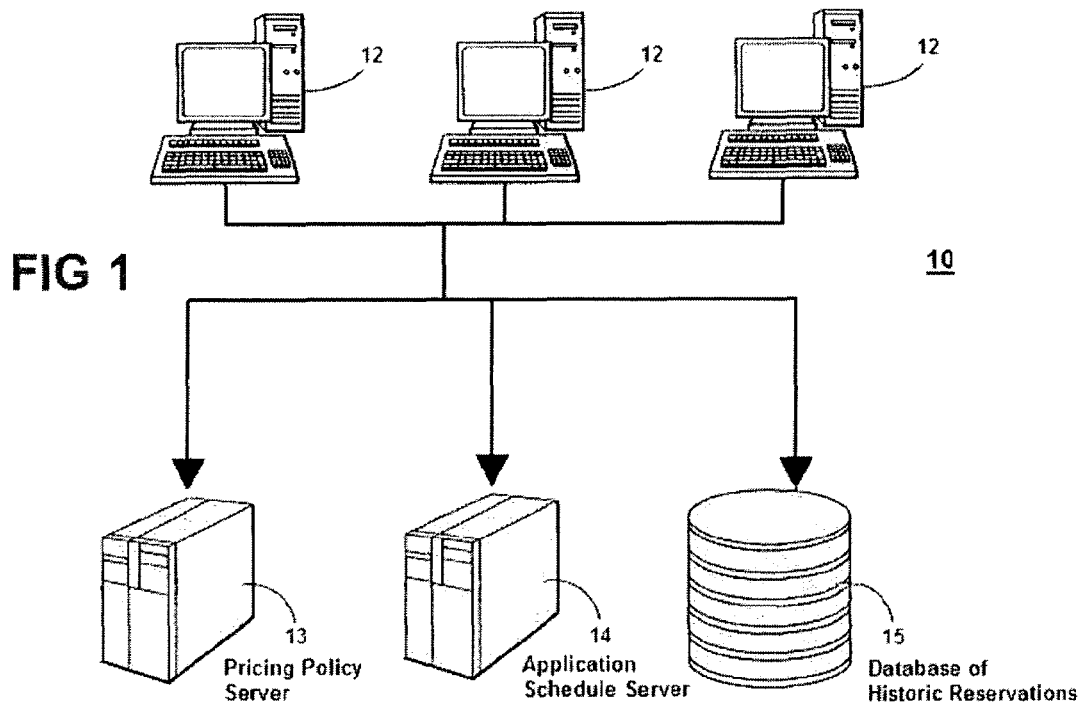
FIG. 1 is a schematic diagram of networked computer system that can be employed to implement the preferred embodiment of the present invention.
FIG. 2 is an example of a pricing policy table that is employed to illustrate the functionality of the preferred embodiment.

It is preferred that each pricing policy should have a name or other unique identifier that may be used to reference it. It is also preferred that the policy should be parameterized by an ordered set of inventory threshold values and an associated ordered set of prices. To illustrate this design, reference is made to FIG. 2, which represents a typical state of the pricing policy table 21. In this case, the pricing policy table 21 describes just two pricing policies. The first is referenced by the unique identifier "greedy" and represents a policy of quoting a reserved service at $50/day for any reservation period where 10 or more rooms are still unreserved and at $100/day if 1 or more rooms are still unreserved. The second pricing policy is referenced by the unique identifier "generous" and represents a policy of quoting a reserved service at $50/day for any reservation period where 5 or more rooms are still unreserved and at $100/day if 1 or more rooms are still unreserved.

An application schedule is defined as a rule for determining which policy should be used at various times or circumstances of computing a quote. For example, an application schedule might represent that a pricing policy referenced by the identifier "greedy" is applied under the condition that we are making a quote for a reservation that begins on a Monday, while a pricing policy referenced by the identifier "generous" is applied under all other conditions.

Figure 4:
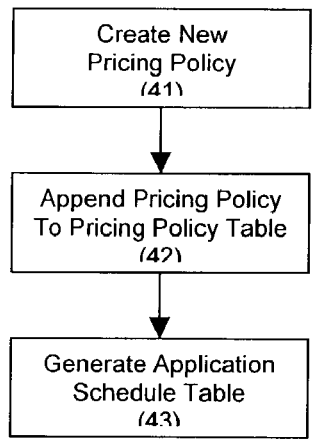
FIG. 4, FIG. 5 and FIG. 6 are flow charts illustrating the logic used in an exemplary application of the preferred embodiment.

In the operation of the system 10, a system operator periodically enters a new policy rule and a unique identifier into one of the computers 12. The response to this action is illustrated in FIG. 4. In response, the pricing policy server 13 creates a new record in the pricing policy table, which hereafter stores the new policy rule and its associated identifier. In further response, the application schedule server 14 generates a new application schedule. It is preferred that the application schedule is parameterized by the arrival date of the quote condition and that it repeats in a periodic fashion with periodicity 2, 3 or 5. These patterns are desirable because they ensure that the impact of each pricing policy on total system revenue will be more easily assessed and compared.

FIG. 3 illustrates one possible state of the application schedule table 31 wherein pricing policies identified by the references "greedy", "neutral" and "generous" are scheduled to apply to various quote conditions. In this case the represented application schedule has periodicity of 3 because the same pricing policy is applied whenever the arrival date of distinct quote circumstances differs by an integer multiple of 3. Many similar configurations of application schedule table 31 are possible. Such variations could incorporate additional pricing policies.

Figure 5:
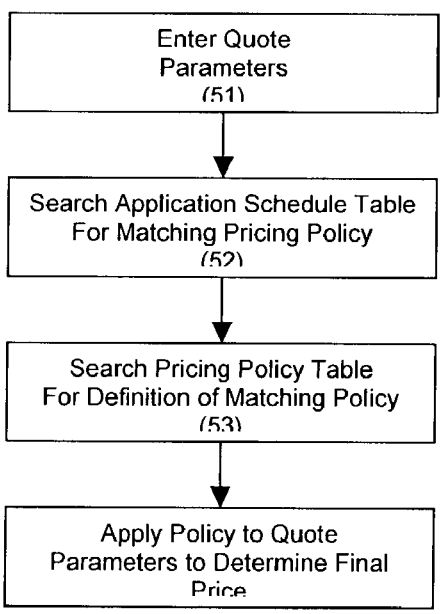

In further operation of the system 10, a system operator periodically enters a request for a price quote for a particular resource on a given set of reservation dates into one of the computers 12. The response to this action is illustrated in FIG. 5. In response, the computer contacts the application schedule server 14 to access the application schedule table and then contacts the pricing policy server 13 to access the pricing policy table. The control logic for using the tables is that the application schedule table is searched in order to determine which pricing policy is scheduled to apply to the conditions entered by the system operator. Hereafter the found policy is referred to as the "matching policy." The control logic further dictates that the pricing policy table should be searched to find the definition of the matching policy. The control logic further dictates that the defined rule of the matching policy be applied to the conditions of the quote request to determine the final value that is to be quoted to the customer.

Additional control logic is executed periodically according to a timer event, which may be configured to occur once per week or on any other periodic basis. The purpose of this additional logic is to identify which if any of the pricing policies represented in the application schedule table may be under-performing in terms of its contribution to the total system profit achieved by the quoting process.

Figure 6:
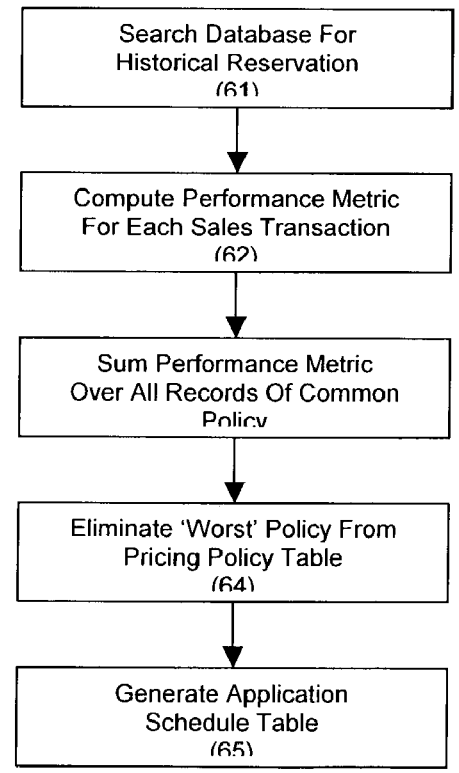

The response to the timer event is illustrated in FIG. 6. In response to the timer event the control logic executing in computer 12 to access database of historic reservations 15 to retrieve all purchase records that have been created in the time since the application schedule was last modified. The control logic then computes a transaction-level performance metric for each of the sales records and replicates the steps for determining an associated pricing policy (as outlined above) for each such sales record. The preferred method for computing this metric is to subtract the operational costs of servicing the reservation as well as other applicable costs from the total revenue associated with the reservation. A total contribution for each pricing policy is then computed by summing the transaction level performance metric over all transactions associated with said pricing policy. Finally, the control logic proceeds to compare the computed sums and determine which of the active policies has the lowest associated sum and this pricing policy is then removed from the pricing policy table. A new application schedule is then computed in the same manner described previously.

The benefit of executing this final step derives from the fact that the modified system will tend to achieve greater revenues than the original system due to the increased representation of pricing polices that have higher contribution levels on average and due to the reduced representation of pricing policies that have lower contribution levels on average.

In conclusion, the present invention, through the use of comparative trials of complex pricing policies which are applied according to an application schedule that has a periodic character with respect to the arrival date of quoting circumstances, provides a vastly improved and robust revenue management system and method that can easily incorporate complex considerations and be easily implemented without requiring complex computer software. Although the present invention has been disclosed in terms of a preferred embodiment and variations thereon, it will be understood that numerous additional variations and modifications could be made thereto without departing from the scope of the invention as set forth in the following claims.

We claim:

1. A method of optimizing the process of quoting prices for reserving a date-constrained service comprising the steps:
    defining a family of candidate pricing policies wherein each of said pricing policies are comprised of:
        a rule for determining the quoted price based on parameters of a quote request as well as data parameters describing at least one or more of the following: inventory levels, time remaining until service commencement, historic pattern of bookings, reservations or sales, competitor price, period of service;
    generating an application schedule, wherein said application schedule comprises:
        a plurality of pairs of data, wherein the first element of each said pair represents a unique quote circumstance; the second element of each said pair represents a specific member of said family of candidate pricing policies and wherein said plurality of pairs represents a logical mapping from a unique quote circumstance to a specific member of said family of candidate pricing policies;
    responding to a quote request by, searching said application schedule for the unique data pair that corresponds to the parameters of said quote request and identifying the secondary element of said unique data pair as the applicable pricing policy that will be applied in response to said quote request;
    applying said applicable pricing policy to the parameters of said quote request and said data parameters; determining and quoting a price value in final response to said quote request;
    computing a performance metric associated with any sale resulting from said quoting process; summing said performance metric over all sales transactions associated with each member of said family of candidate policies; comparing said summed performance metric of each member of said family of candidate policies and eliminating at least one sub-optimal members of said family of candidate pricing policies based on the value of its associated performance metric; whereby the sub-optimal member of said family of pricing policies are thus identified and removed from said family of pricing policies and an improved optimal family of policies is thus determined.

2. The method of optimizing the process of quoting prices as set forth in claim 1, including the step: generating an application schedule wherein said application schedule is comprised of: a plurality of pairs of data, wherein the first element of each said pair is an acceptable service-commencement-date for said date-constrained service; the second element of each said pair represents a specific member of said family of candidate policies and wherein the values of the second element of these pairs follow a cyclical pattern when the pairs are sorted with respect to the first elements.

3. The method of optimizing the process of quoting prices according to claim 1, including the step: computing said performance metric by subtracting from the revenue associated with said sales transaction the cost of providing the service promised under the said sales transaction and further subtracting any additional applicable costs associated with said transaction.

4. The method of optimizing the process of quoting prices according to claim 1, wherein said family of candidate policies includes executable inventory-contingent threshold rules, including the step: executing said rules by comparing the minimal remaining inventory of all associated inventory dates with a parameterized threshold value.

* * * * *